(12) United States Patent
Miglioranza

(10) Patent No.: US 8,149,098 B2
(45) Date of Patent: Apr. 3, 2012

(54) HUMAN-BICYCLE INTERACTION DEVICE

(75) Inventor: Federico Miglioranza, Schio (IT)

(73) Assignee: Campagnolo S.R.L., Vicenza (IT)

( * ) Notice: Subject to any disclaimer, the term of this patent is extended or adjusted under 35 U.S.C. 154(b) by 206 days.

(21) Appl. No.: 12/021,609

(22) Filed: Jan. 29, 2008

(65) Prior Publication Data

US 2008/0180233 A1 Jul. 31, 2008

(30) Foreign Application Priority Data

Jan. 30, 2007 (IT) .............................. MI2007A0140

(51) Int. Cl.
*B62J 3/00* (2006.01)
(52) U.S. Cl. ........ 340/432; 340/441; 340/438; 340/456; 340/463; 340/466
(58) Field of Classification Search .................. 340/432, 340/441, 438, 456, 463, 466; 368/69; 280/288.4; 701/1
See application file for complete search history.

(56) References Cited

U.S. PATENT DOCUMENTS

| | | | |
|---|---|---|---|
| 5,236,759 A | | 8/1993 | Sakurai |
| 5,370,412 A | * | 12/1994 | Chou .......................... 280/288.4 |
| 5,889,463 A | * | 3/1999 | Judd et al. ...................... 340/427 |
| 5,971,116 A | | 10/1999 | Franklin |
| 6,192,300 B1 | * | 2/2001 | Watarai et al. ..................... 701/1 |
| 6,204,752 B1 | | 3/2001 | Kishimoto |
| 6,281,674 B1 | * | 8/2001 | Huang .......................... 324/174 |
| 6,682,087 B1 | | 1/2004 | Takeda |
| 6,757,567 B2 | | 6/2004 | Campagnolo et al. |
| 6,786,866 B2 | * | 9/2004 | Odagiri et al. ................ 600/300 |
| 6,844,845 B1 | * | 1/2005 | Whiteside et al. ......... 342/357.1 |
| 6,903,652 B2 | * | 6/2005 | Noguchi et al. ........... 340/425.5 |
| 7,089,100 B2 | | 8/2006 | Takeda et al. |
| 7,132,931 B2 | * | 11/2006 | Okada ........................... 340/427 |
| 7,408,447 B2 | * | 8/2008 | Watson ......................... 340/432 |
| 7,495,549 B2 | | 2/2009 | Acres |
| 2001/0004913 A1 | | 6/2001 | Maeda et al. |
| 2003/0207731 A1 | | 11/2003 | Oohara |
| 2004/0000990 A1 | * | 1/2004 | Takeda et al. ................ 340/432 |
| 2004/0089092 A1 | | 5/2004 | Campagnolo |
| 2004/0239489 A1 | * | 12/2004 | Takeda ......................... 340/432 |
| 2005/0008992 A1 | | 1/2005 | Westergaard et al. |
| 2005/0195094 A1 | | 9/2005 | White |
| 2007/0179632 A1 | | 8/2007 | Campagnolo et al. |

(Continued)

FOREIGN PATENT DOCUMENTS

CN 1192033 9/1998

(Continued)

OTHER PUBLICATIONS

European Search Report, Appl. No. EP 08005436, dated Jan. 30, 2009.

(Continued)

*Primary Examiner* — Jennifer Mehmood
*Assistant Examiner* — Hongmin Fan
(74) *Attorney, Agent, or Firm* — Volpe and Koenig, P.C.

(57) ABSTRACT

A human-bicycle interaction device has an interface for a person to enter electronic commands and a display unit responding to the commands, wherein the interface has a directional button with a non-operating position and at least two operating positions. The use of the device is intuitive and requires few hardware connections and the display is tightly sealed.

37 Claims, 14 Drawing Sheets

U.S. PATENT DOCUMENTS

| | | |
|---|---|---|
| 2008/0180233 A1 | 7/2008 | Miglioranza |
| 2008/0252297 A1 | 10/2008 | Miglioranza |
| 2008/0312799 A1 | 12/2008 | Miglioranza |
| 2009/0170660 A1 | 7/2009 | Miglioranza |

FOREIGN PATENT DOCUMENTS

| | | |
|---|---|---|
| CN | 1301622 | 7/2001 |
| DE | 19640248 | 10/1997 |
| DE | 202004003150 | 7/2004 |
| DE | 102006019385 | 10/2007 |
| EP | 0794113 | 9/1997 |
| EP | 0846614 | 6/1998 |
| EP | 1050944 | 11/2000 |
| EP | 1295785 | 3/2003 |
| EP | 1298050 | 4/2003 |
| EP | 1340673 | 9/2003 |
| EP | 1452431 | 9/2004 |
| EP | 1463013 | 9/2004 |
| EP | 1557926 | 7/2005 |
| EP | 1500582 | 12/2005 |
| EP | 1630095 | 3/2006 |
| GB | 2152247 | 7/1985 |
| JP | 10199374 | 7/1998 |
| JP | 2002260492 | 9/2002 |
| JP | 2002271047 | 9/2002 |
| WO | 0100281 | 1/2001 |
| WO | 2004087490 | 10/2004 |
| WO | 2005041234 | 5/2005 |
| WO | 2005041234 A1 | 5/2005 |
| WO | 2007075734 | 7/2007 |

OTHER PUBLICATIONS

European Search Report, Appl. No. EP 08005414.1-2421, dated Apr. 6, 2009.

European Search Report, Appl. No. EP 08005414.1-2421, dated Apr. 6, 2009.

Chinese Office Acton, Appl. No. 200810004457.4, dated Jul. 14, 2011.

European Search Report, Appl. No. EP 08005436, dated Jan. 30, 2009.

European Search Report, Appl. No. EP 08005414.1-2421, Apr. 6, 2009.

* cited by examiner

HUMAN-BICYCLE INTERACTION DEVICE

FIELD OF INVENTION

The field of the invention is a human-bicycle interaction device.

BACKGROUND

To perform human-bicycle interaction, cycle computers are known that provide for the capability of displaying, for example, current, average, maximum and minimum speed, partial and/or total travel times, distance traveled, heart rate, gear ratio currently engaged etc.

In order to clearly and directly display the data of interest at a given time, and considering the small size of the display area, cyclecomputers typically comprise a plurality of buttons for selecting the pages to be displayed.

The buttons can also be provided to select or enter values of various parameters, for example relating to the cyclist, such as weight and age for a heart rate meter function, as well as to send commands for interaction with one or more electronic components of the bicycle.

SUMMARY

The invention concerns a human-bicycle interaction device, comprising an interface for a person to enter electronic commands and a display unit responding to the commands, wherein the interface comprises a directional button having a non-operating position and at least two operating positions.

BRIEF DESCRIPTION OF THE DRAWING(S)

Further features and advantages of the present invention shall become clearer from the following detailed description of some preferred embodiments thereof, made with reference to the attached drawings. In such drawings.

Figure 1:
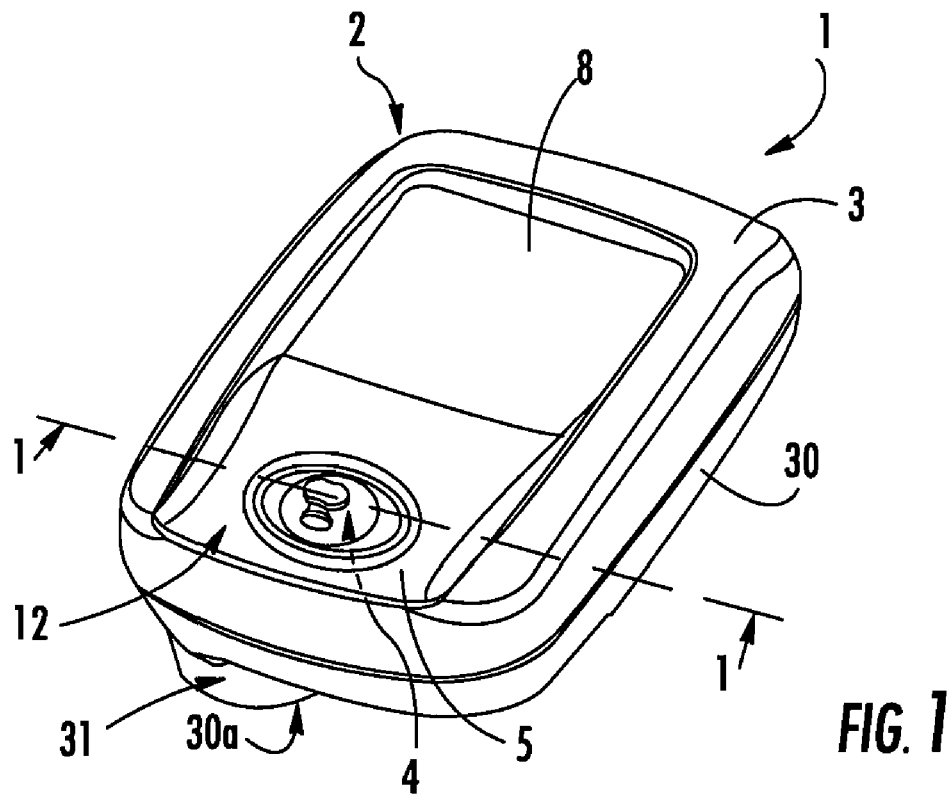
FIG. 1 shows an isometric view of a human-bicycle interaction device or cyclecomputer according to an embodiment of the invention.
Figure 2:
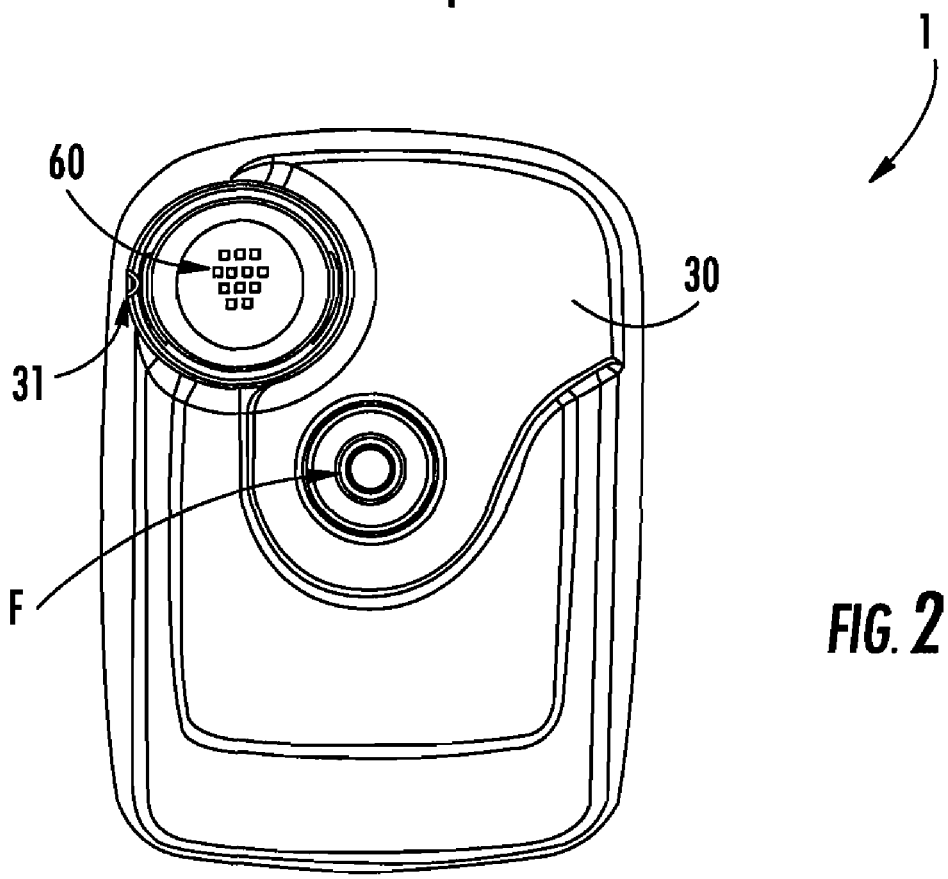
FIG. 2 shows the bottom view of the cyclecomputer of FIG. 1.
Figure 3:
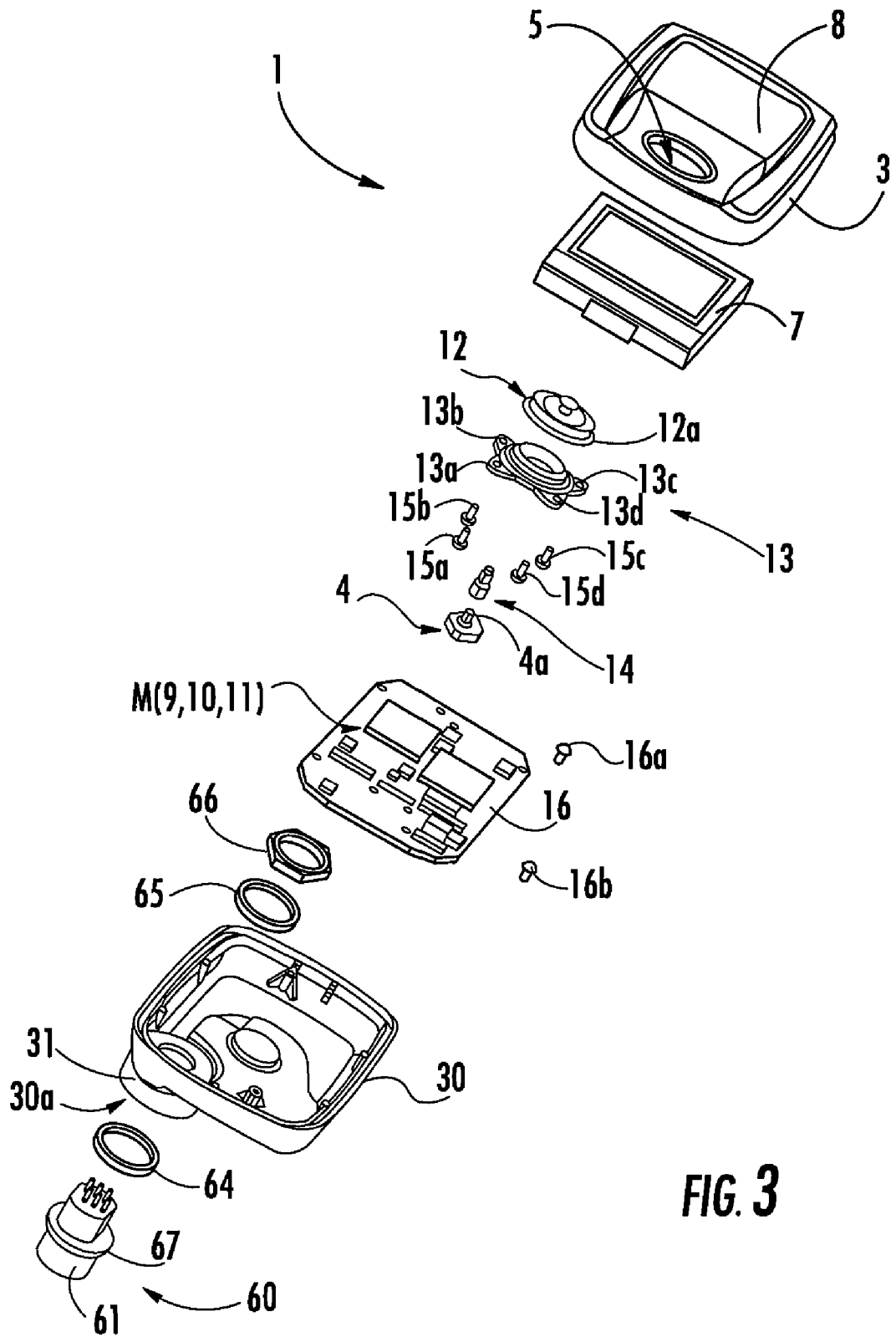
FIG. 3 shows the exploded view of the cyclecomputer of FIG. 1.

DETAILED DESCRIPTION OF THE PREFERRED EMBODIMENT(S) INTRODUCTION TO THE EMBODIMENTS

The invention concerns a human-bicycle interaction device, comprising an interface for a person to enter electronic commands and a display unit responding to the commands, wherein the interface comprises a directional button having a non-operating position and at least two operating positions.

By means of the directional button it is possible to carry out many operations in an intuitive manner, without moving the finger on the human-bicycle interaction device.

The provision of a directional button allows the number of hardware connections to be advantageously reduced with respect to known-type systems.

The human-bicycle interaction device is also better sealed against water infiltrations compared to known-type systems.

The operating positions of the directional button can be two only, for example to only impart the gearshifting commands in the two directions in the case of a control device, but preferably they are more than two, to allow a wider range of functions, also by making a sort of graphical user interface (GUI) on the display unit. For example, the operating positions of the directional button can be three, five or nine.

One of the operating positions is preferably obtained by pressing the directional button, while the remaining operating positions are preferably obtained by tilting a shaft of the directional button along equally angularly spaced directions.

Preferably, the human-bicycle interaction device comprises a casing that, more preferably, is tight sealed.

Preferably, the casing is made of two tightly joined portions.

More preferably, the two portions of the casing are joined through ultrasound glueing, glueing with interposition of glue or through screws with interposition of a sealing gasket.

Preferably, a button cover is provided at an aperture of the casing and at the directional button, the button cover being tightly associated with the casing.

The button cover is preferably made of a silicone-like material and has an abutment edge, a pressing member being provided to push the abutment edge against the casing.

As an alternative to the provision of a button cover and a pressing member, an area of yielding material can be provided, made integrally with the casing at the directional button.

Preferably, a transparent window is further provided at the display unit, the transparent window being tightly associated with the casing.

The transparent window can be integrally made with the casing, for example through co-moulding, or it can be inserted in an aperture of the casing, sealing means being provided between the transparent window and the aperture.

The human-bicycle interaction device can further comprise a data and/or power connector for removable connection, through a matching connector, with a power source and/or with one or more devices of the bicycle.

Tight sealing means are provided between the connector and the casing.

A collar projecting outwards from the casing around the connector is also provided.

The connector can provide for the power connection with the power source.

Alternatively, the human-bicycle interaction device can comprise a battery power source housed within the casing.

The human-bicycle interaction device can comprise a wireless transceiver unit for communicating with one or more devices of the bicycle.

When both the internal battery power source and the wireless transceiver unit are provided, the connector can advantageously be absent, further improving the tightness of the human-bicycle interaction device.

The human-bicycle interaction device can comprise a management unit for the directional button, a management and control unit for the display unit, and a management and control unit for the functions of the human-bicycle interaction device itself.

The management and control units advantageously share a single micro-processor unit.

The directional button can comprise a plurality of switches each having a normal state and an actuation state corresponding to an operating position of the directional button, the management unit for the directional button being configured to detect the actuation state of one of the plurality of switches.

The management unit for the directional button comprises a switch for partial insulation from a supply voltage, the insulation switch being driven with a signal having a comparatively small duty cycle.

By thus excluding the continued powering of part of the management unit for the directional button it is possible to allow the energy consumption of the human-bicycle interaction device to be contained.

In an embodiment, the management unit for the directional button comprises a unit for encoding the state of the plurality of switches.

In a first embodiment, the human-bicycle interaction device is a cyclecomputer.

The interface of the cyclecomputer only comprises the directional button.

The directional button can be accessible from an upper surface or a lower surface of a casing of the cyclecomputer.

In a second embodiment, the human-bicycle interaction device is a control device.

The control device preferably further comprises at least one lever for imparting mechanical commands or for actuating one or more switches to control a brake or a mechanical, electro-mechanical or electronic gearshift.

DESCRIPTION OF THE EMBODIMENTS

Figure 16:
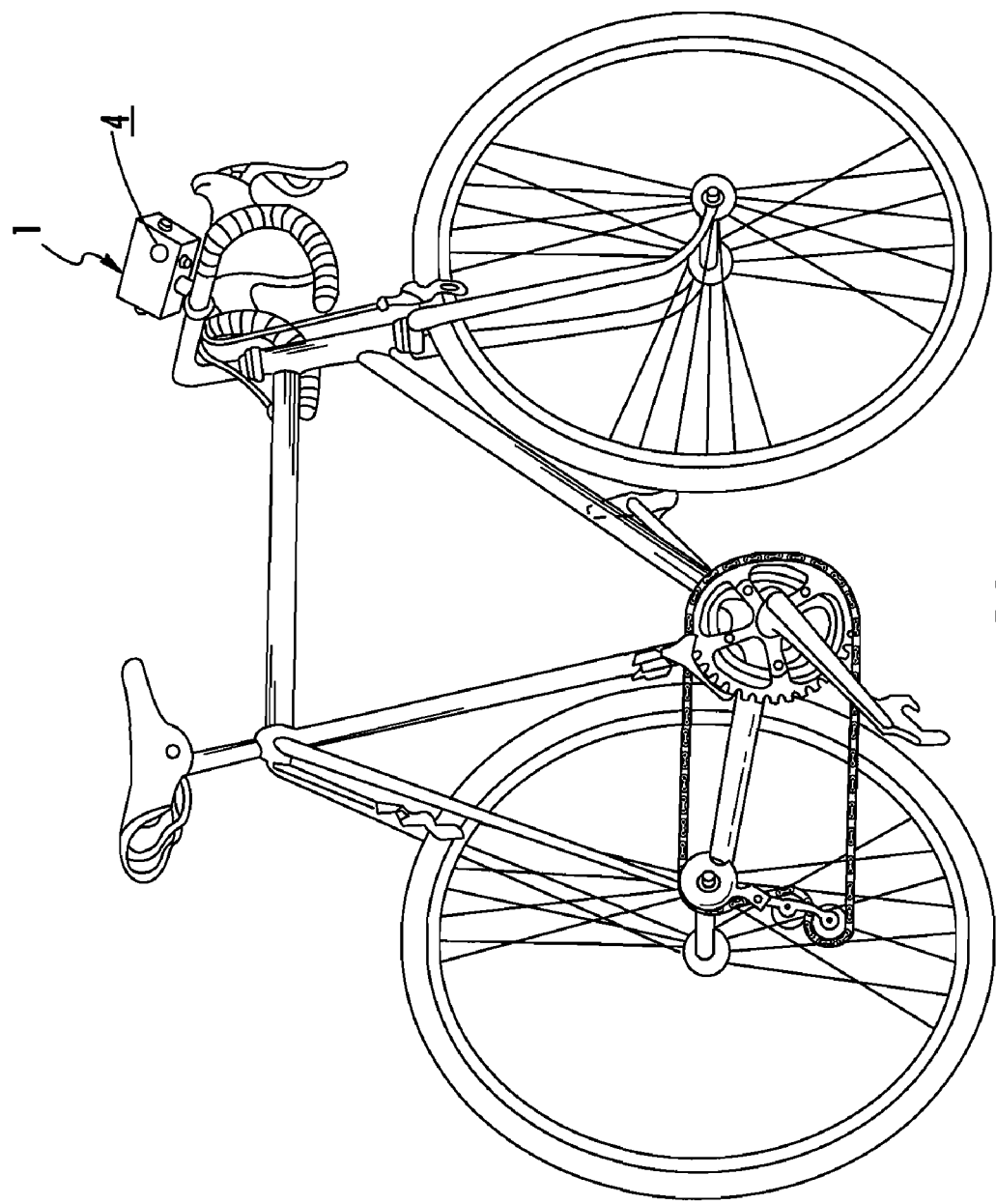
FIG. 16 shows an elevation of a human-bicycle interaction device or control device mounted on a bicycle.

In FIGS. 1 to 4 a human-bicycle interaction device 1 on a bicycle (cycle generally shown in FIG. 16) according to an embodiment of the invention is shown.

The human-bicycle interaction device 1 generally allows the cyclist to be provided with data relative to the state of the bicycle or to the riding conditions, for example to selectively provide one or more data among the current, average, maximum and minimum speed, the partial and/or total travel times, the distance traveled, the heart rate, the gear ratio currently engaged etc., and/or allows the cyclist or a technician to interact with one or more electronic components of the bicycle, such as an electronic or electro-mechanical gearshift, for example to change the gear ratio or set the alignment of the derailleur with respect to the toothed wheels, or such as the human-bicycle interaction device 1 itself, for example to enter parameters relative to the cyclist such as weight and age for a heart rate meter function, as well as to select the type of data being displayed at a given time.

Human-bicycle interaction devices of this type are also called cyclecomputer and this term shall be used hereinafter for the sake of brevity.

The cyclecomputer 1 comprises a casing 2 of a compact shape and suitable for being mounted preferably on the handlebars of the bicycle in an area easy to be seen by the cyclist and easy to be reached by the cyclist's fingers, normally near to the center of the handlebars. To this purpose the cyclecomputer 1 can be provided with a strap (not shown) for connection to the handlebars, that can be integrally made with the casing 2 or can be associated therewith through suitable connection members, for example a screw that engages in a threaded hole F made in the bottom of the cyclecomputer 1.

The casing 2 has a top portion 3 and a bottom portion 30 suitably tightly joined to each other, for example through ultrasound gluing, through gluing with interposition of glue or through screws with interposition of a sealing gasket between the two portions 3 and 30.

The cyclecomputer 1 further comprises an input interface in the form of a directional button 4 housed within the casing 2 and actuatable by the cyclist, as better described later on, through an opening 5 made on the top portion 3 of the casing 2, and an output interface in the form of a display unit 7, housed within the casing 2 and visible from the outside through a transparent area 8 of the top portion 3 of the casing 2.

The cyclecomputer 1 further comprises, housed within the casing 2, electrical and electronic components comprising, from a logic point of view, a management unit 9 for the directional button 4, a management and control unit 10 for the display unit 7, and a management and control unit 11 for the functions of the cyclecomputer 1.

The management and control units 9, 10 and 11 preferably share a single micro-processor unit M mounted on a support board 16 fixed through screws 16a, 16b to the bottom portion 30 of the casing 2.

The directional button 4 is mounted on the support board 16.

The transparent area 8 at the display unit 7 is preferably integrally made with the top portion 3 of the casing, for example through co-moulding. According to a not shown alternative, the transparent area 8 can have a window inserted in an aperture of the top portion 3 of the casing 2, with interposition of a gasket or an e.g. silicone-like sealer, or other means for ensuring tightness of the casing 2 at the aperture.

Between the top portion 3 of the casing 2 and the directional button 4 there are a button cover 12, preferably made of a silicone-like material and having an abutment edge 12a, a pressing member 13 provided with holes 13a-13d for receiving fixing screws 15a-15d, and possibly an actuator member 14 that makes a physical connection between the button cover 12 and the actuation arm 4a of the directional button 4. Alternatively, the button cover 12 could act directly on the actuation arm 4a, the actuator member 14 being absent.

In the assembled state, the pressing member 13 is fixedly connected to the top portion 3 of the casing 2 through the fixing screws 15a-15b extending in the holes 13a-13d and in suitable threaded holes of the casing 2. The pressing member 13 pushes against the abutment edge 12a of the button cover 12 tightly sealing the opening 5 of the casing 2 with respect to the outside.

It is worthwhile highlighting that the provision in the casing 2 of a single hole or opening 5 for the directional button 4 allows minimizing the surfaces to be insulated to keep the internal space of the casing 2 tightly sealed with respect to the outside.

In an alternative embodiment, not shown, the button cover 12 and the pressing member 13 could be replaced by an area of yielding material of the top portion 3 of the casing 2, for example integrally made through co-molding of the yielding material with the material of the rest of the top portion 3, or by an area of yielding material inserted in an aperture of the top portion 3 of the casing 2 with interposition of a gasket or an e.g. silicone-like sealer, or other means for ensuring the tightness of the casing 2 at the aperture.

Figure 4:
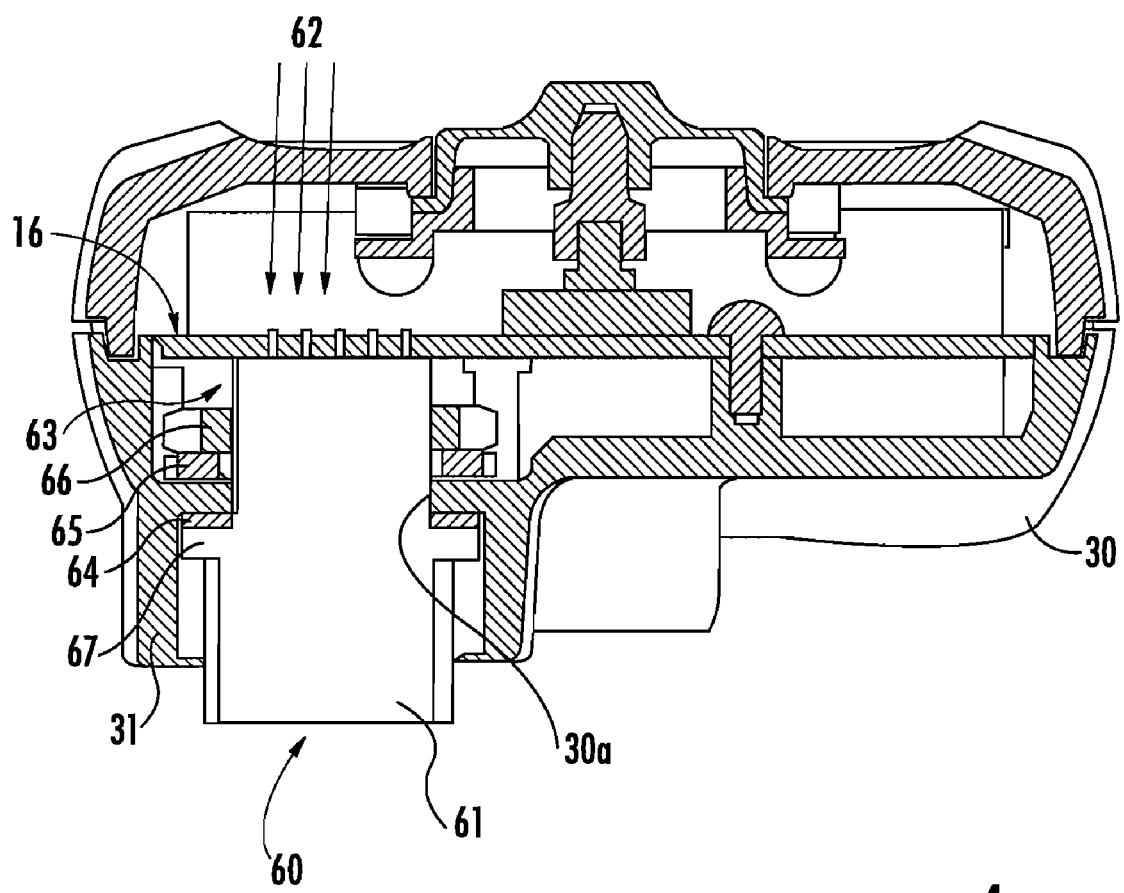
FIG. 4 shows the section view along plane I-I of FIG. 1, a connector of the cyclecomputer being also shown.

As shown in FIG. 4, a removable data and/or power connector 60, preferably of the female type, is connected in an opening 30*a* of the bottom portion 30 of the casing 2 for connection, through a matching connector (not shown), of the components internal to the casing 2 with a power source and/or with one or more devices of the bicycle, for example a speed sensor, an inclinometer, an actuator of a derailleur etc.

The connector 60 can for example be the female connector of the HR30 series of HIROSE ELECTRIC CO., LTD-TOKYO, Japan, and in particular HR30-8R-12SD, and it can be provided for connection with a "male" connector to which the cables from the power source and/or from the electronic devices of the bicycle lead, for example the male connector of the HR30 series of HIROSE ELECTRIC CO., and in particular the HR30-8P-12PC.

The connector 60 comprises a main body 61 having contacts 62 projecting from its top portion that can be soldered to the support board 16. The main body is provided in its upper portion in FIG. 4 with an outer threading 63. An annular flange 67 extends peripherally around the main body 61 below the outer threading 63.

For attachment of the connector 60 to the bottom portion 30 of the casing 2, a closing bushing 66 is provided, having an inner threading matching the outer threading 63 of the main body 61. The closing bushing 66 is housed within the casing 2 and is screwed onto the main body 61 thus locking against the casing 2 with the interposition of a metal anti-friction ring 65 extending around the opening 30*a*. A sealing ring 64 extends around the opening 30*a*, outside of the casing 2, and is brought into abutment against the casing 2 by the annular flange 67 of the connector 60.

A collar 31 projects outwards around the opening 30*a* of the casing 2, to further improve the tightness of the cyclecomputer 1 and to protect the connection between the connector 60 and the matching one. The collar 31 could in any case be absent.

In an alternative embodiment, when the cyclecomputer 1 is provided with a battery energy source housed within the casing 2, the connector 60 and the opening 30*a* of the casing 2 could be absent and the transmission could take place wirelessly, the cyclecomputer 1 being provided with a transceiver unit housed within the casing 2.

In a further embodiment, the casing 2 could only house the directional button 4 and the display unit 7, while the electronics M could be outside of the casing 2. The communication between the electronics M of the cyclecomputer 1 and the electronic devices of the bicycle could take place through a physical connection, for example through the connector 60 and the matching one, or through radio signals, in this case providing for use of the internal energy source.

Figure 5:
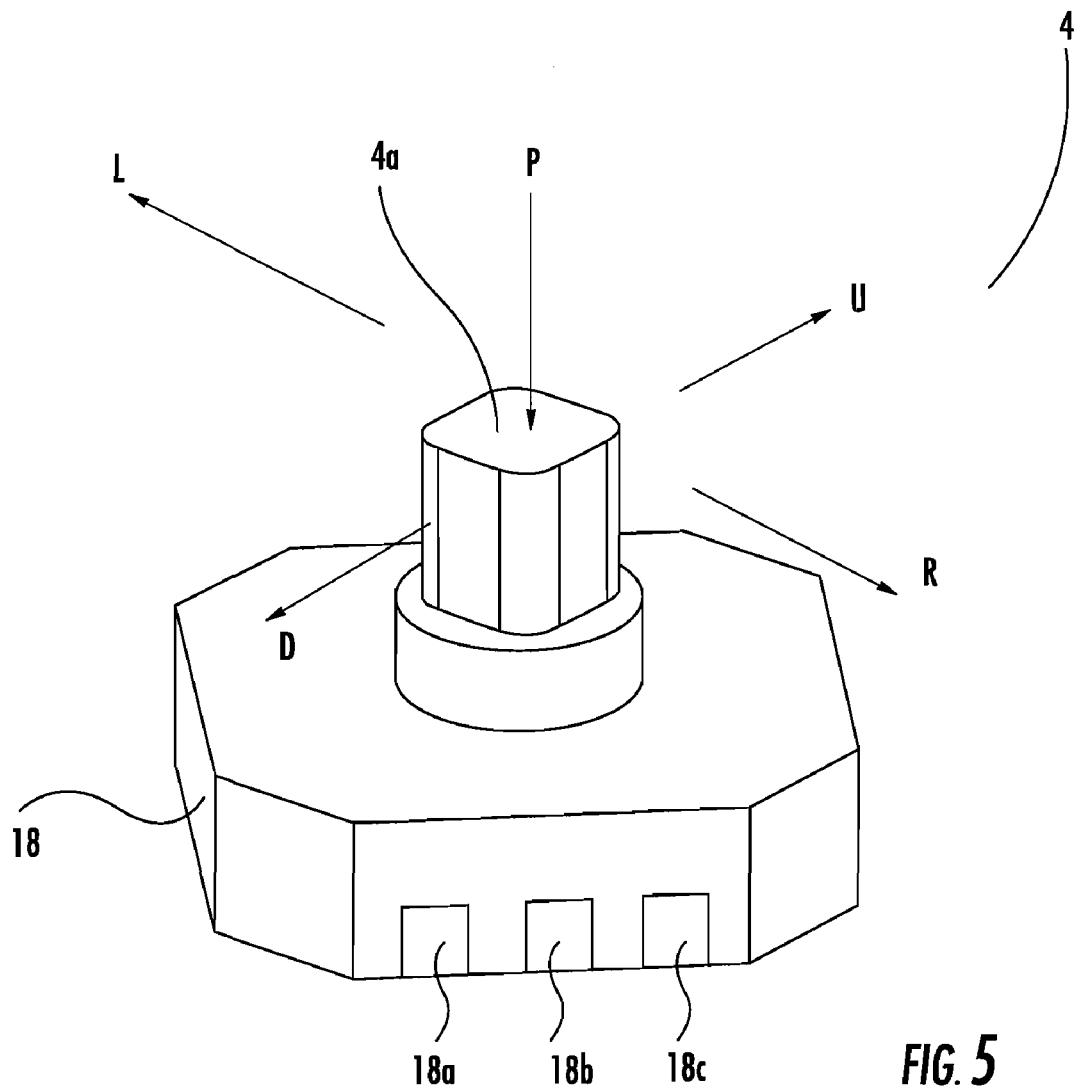
FIG. 5 shows a magnified view of a first embodiment of a directional button of the cyclecomputer of FIG. 1.

The directional button 4 can, for example, be the "4-directional TACT Switch with Center Push" of the SKRH series of ALPS ELECTRIC CO., LTD-TOKYO, Japan. Such a directional button 4 comprises a base 18 where there are the connection terminals, six in total and three 18*a*-18*c* of which can be seen in FIG. 5, and an actuation shaft 4*a* that can take up five operating positions, indicated with L (left), R (right), U (up), D (down) and P (push), as well as the non-operating position, centered and transversal to the base 18, to which it returns after it has been released from one of the operating positions.

Figure 6:
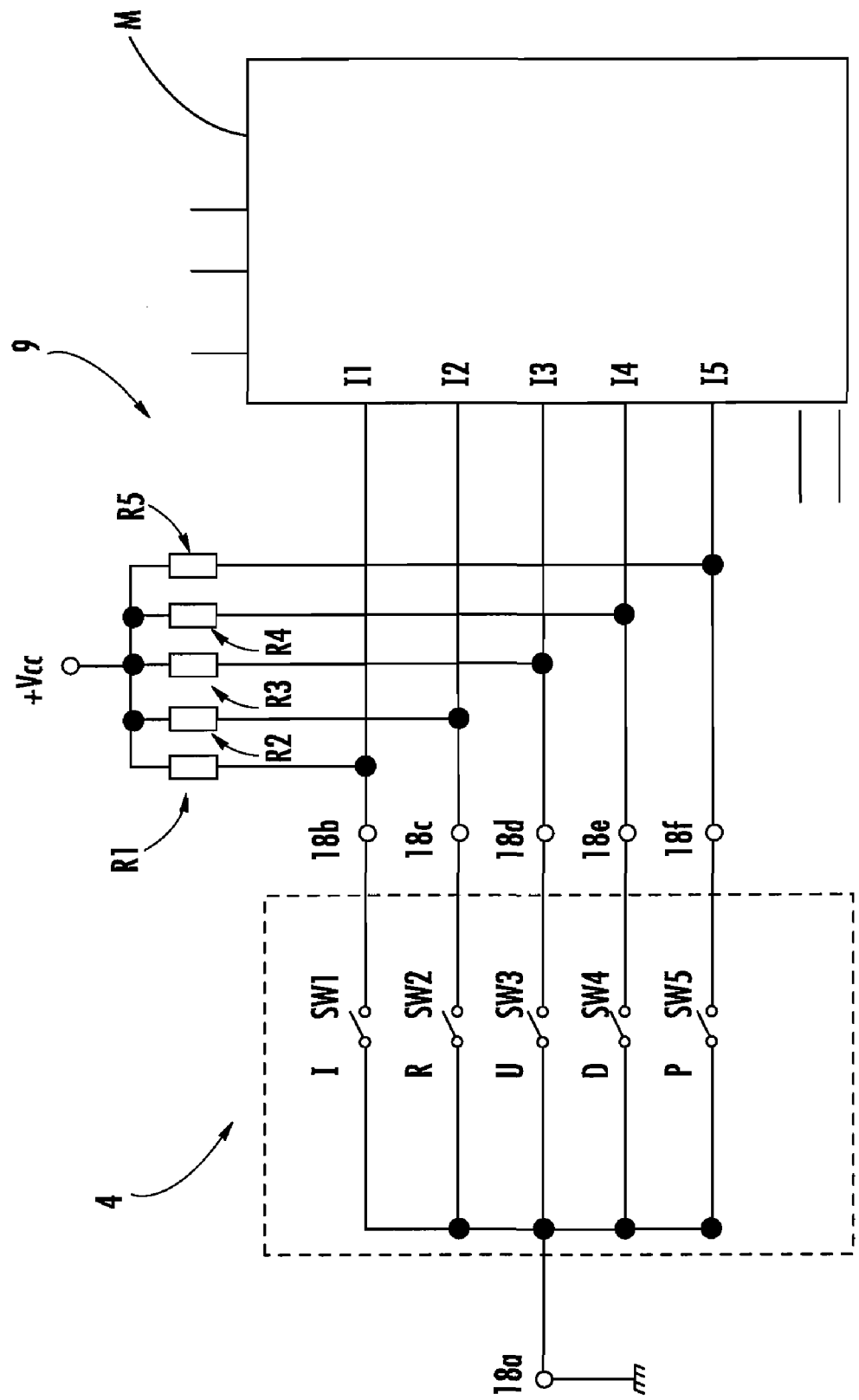
FIG. 6 shows a logic diagram of the cyclecomputer of FIG. 1 with the directional button of FIG. 5.

The logic diagram of the cyclecomputer 1 is shown in FIG. 6.

The directional button 4 comprises five normally open switches SW1-SW5, respectively closed when the actuation shaft 4*a* is taken into one of the operating positions. The switches SW1-SW5 are arranged between a grounded common terminal 18*a* and the output terminals 18*b*-18*f*.

Each output terminal 18*b*-18*f* of the switch 4 is connected to a corresponding input I1-I5 of the microprocessor M that is part of the management unit 9 for the directional button 4.

Each line between an output terminal 18*b*-18*f* of the switch 4 and an input I1-I5 of the microprocessor M is connected to a common power supply terminal +Vcc through a corresponding pull-up resistor R1-R5.

When the directional button 4 is in the non-operating position, all switches SW1-SW5 are open and the voltages detected at the inputs I1-I5 by the microprocessor M correspond to the voltage +Vcc, a voltage to which the logic value 1 is for example assigned.

When the directional button 4 is actuated by moving it into one of the operating positions L, R, U, D, P, the corresponding switch SW1-SW5 is closed and the corresponding output terminal 18*b*-18*f* of the switch 4 is brought to the ground voltage of the common terminal 18*a*.

Such a voltage value, to which, for example, the logic value 0 is assigned, is detected at the corresponding input I1-I5 of the microprocessor M that is part of the management unit 9. The management unit 9 is suitably in communication with the management and control unit 10 for the display unit 7 and with the management and control unit 11 for the functions of the cyclecomputer 1.

In this way, each actuation of the directional button 4 corresponds with an action of the cyclecomputer 1 that can, for example, bring about a change of the current display on the display unit 7, for example a change of the type of data currently displayed and/or the output of a command towards electronic devices of the bicycle, for example the output of a command for an actuator of an electronic or electro-mechanical gearshift to carry out an upshift or a downshift.

In the preferred case of use of one microprocessor M common to the three units 9, 10, 11, communication can take place, for example, through memory location access sharing.

In the embodiment of FIG. 6 the pull-up resistors R1-R5 are constantly connected with the common power supply terminal +Vcc. One of the pull-up resistors R1-R5 for the entire period in which the corresponding switch SW1-SW5 is kept closed is passed through by an electric current, with related energy consumption.

Figure 7:
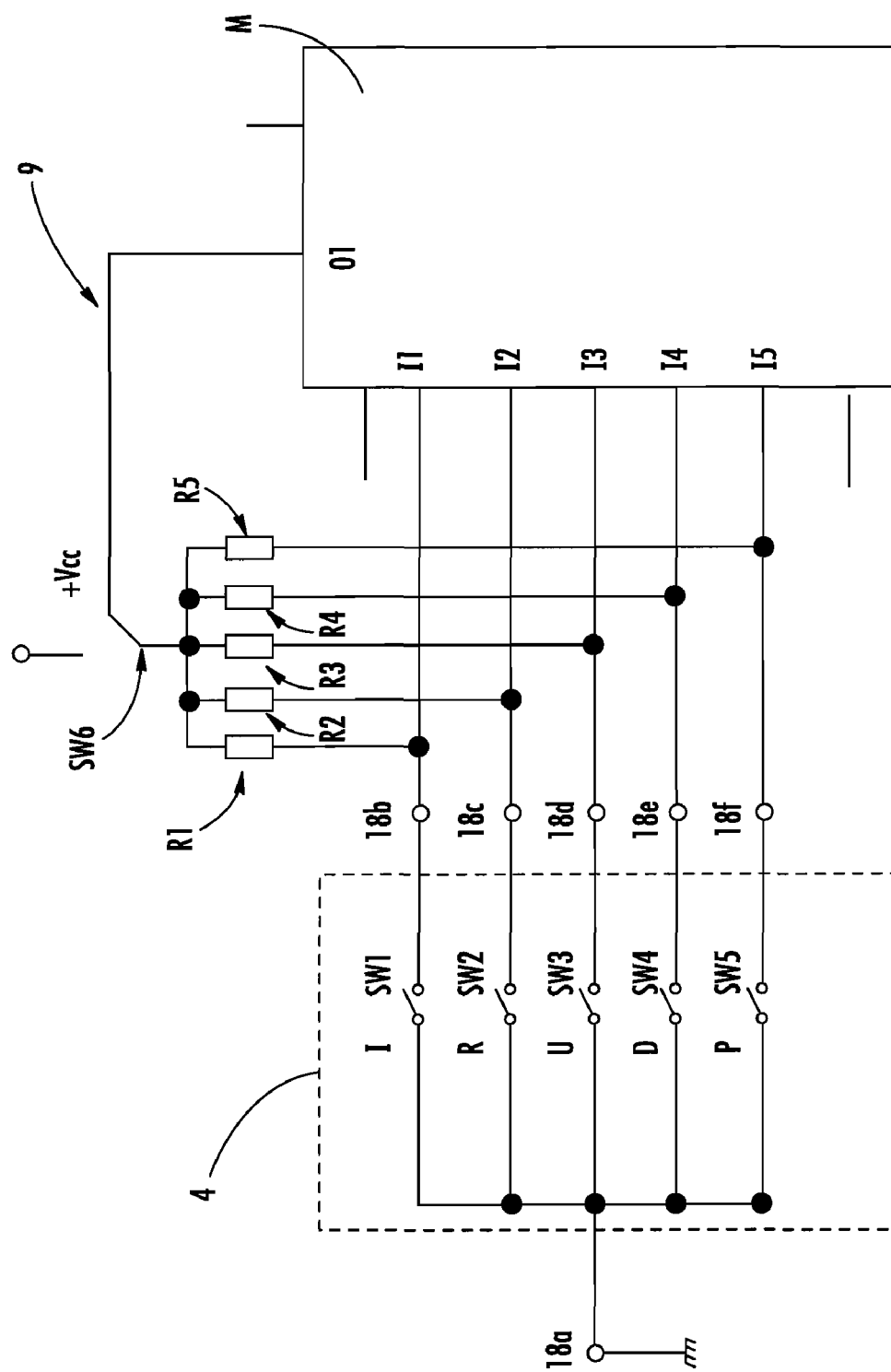
FIG. 7 shows an alternative logic diagram of the cyclecomputer of FIG. 1 with the directional button of FIG. 5.
Figure 8:
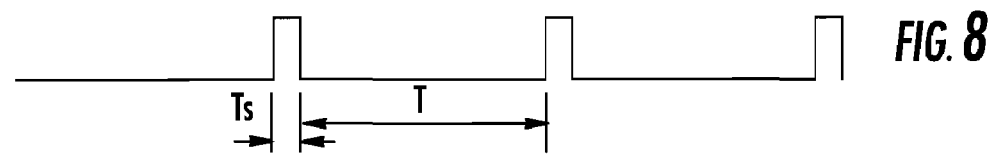
FIG. 8 shows a possible management signal of the cyclecomputer according to the diagram of FIG. 7.

In order to reduce this energy consumption, between the pull-up resistors R1-R5 and the common power supply terminal +Vcc a controlled switch SW6 can be arranged, that is driven close and open by an output O1 of the microprocessor M that is part of the management unit 9, as shown in the embodiment of FIG. 7. A possible form of the control signal at the output O1 is shown in FIG. 8. The control signal shown is a square wave having a comparatively small duty cycle. The switch SW6 is closed by the microprocessor M only for short time instants Ts cyclically over a period T, for example for 0.1 ms every 1 ms, so that at the inputs I1-I5 it is detected, only in such short time instants Ts, in which operating position L, R, U, D, P the directional button 4 is actuated. If the directional switch 4 is actuated for a time greater than Ts, during which one of the switches SW1-SW5 is correspondingly closed, the opening of the switch SW6 interrupts the power supply +Vcc to the pull-up resistors R1-R5, which therefore do not dissipate energy outside of such time periods Ts.

The embodiment of FIG. 8 therefore allows the energy consumption to be decreased, at the expenses of an increased complexity of the management unit 9, which must also manage the switch SW6.

Figure 9:
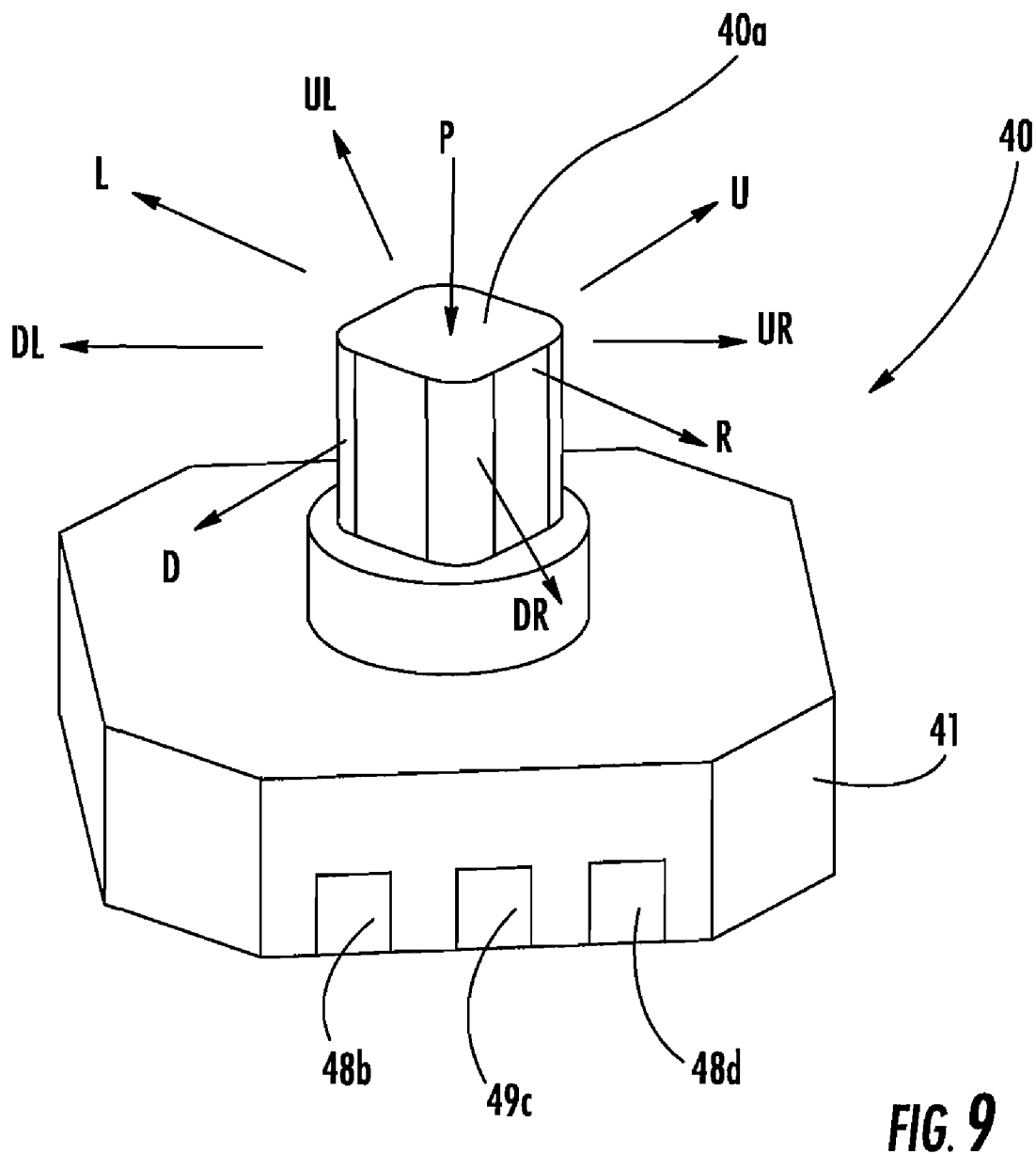
FIG. 9 shows a magnified view of a second embodiment of a directional button of the cyclecomputer of FIG. 1.

FIG. 9 shows an alternative embodiment of a directional button 40. The directional button 40 comprises a base 41 and an actuation shaft 40a that can take up nine operating positions corresponding to the displacement of the actuation shaft 40a in eight positions L, R, U, D, UL, UR, DL, DR essentially 450 from each other, and to the pushing P of the shaft 40a towards the base 41, as well as a non-operating position, centered and transversal to the base 41, to which it returns after it has been released from one of the operating positions.

Figure 10:
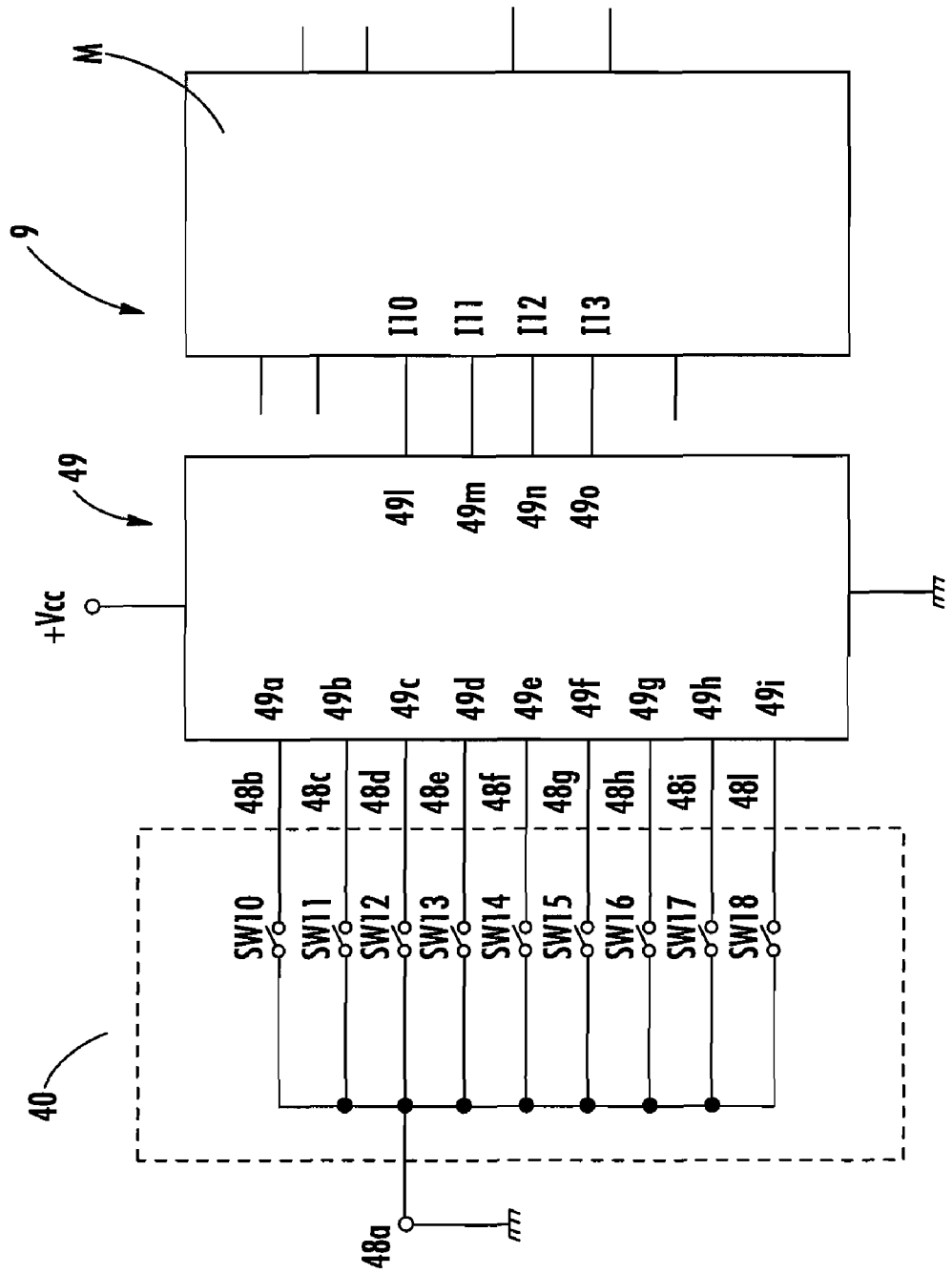
FIG. 10 shows a logic diagram of the cyclecomputer of FIG. 1 with the directional button of FIG. 9.

The logic diagram of the cyclecomputer 1 in the case of use of the directional button 40 is shown in FIG. 10.

The directional button 40 comprises nine normally open switches SW10-SW18, which are closed when the actuation shaft 40a is brought into a respective one of the operating positions. The switches SW10-SW18 are arranged between a common grounded terminal 48a and the output terminals 48b-48i of the directional button 40, only three of which are shown in FIG. 9.

Each output terminal 48b-48l of the directional button 40 is connected with a corresponding input 49a-49i of an encoding unit 49 that is part of the management unit 9 of the directional button 40. The encoding unit 49 is connected with a power supply terminal +Vcc and comprises four outputs 49l-49o connected with corresponding inputs I10-I13 of a microprocessor M that is part of the management unit 9.

When the directional button 40 is in the non-operating position, all switches SW10-SW18 are open. When the directional button 40 is actuated by moving it into one of the operating positions L, R, U, D, UL, UR, DL, DR, P, the corresponding switch SW10-SW18 is closed, grounding the respective terminal 48b-48l and the associated input 49a-49i of the encoding unit 49.

The encoding unit 49 outputs four logic signals at the outputs 49l-49o that as a whole encode the condition of the voltage at its inputs 49a-49i. For example, in the case of use of a binary code, the non-operating condition of the directional button 40 can correspond to code 0000, namely four signals at logic level 0 at the outputs 49l-49o, the first operating condition of the directional button 40 can correspond to code 0001, namely to three signals at logic level 0 at the outputs 49l-49n and a signal at logic level 1 at the output 49o, ... the ninth operating condition of the directional button 40 can correspond to code 1001, namely to a signal at logic level 1 at the output 49l, two signals at logic level 0 at the outputs 49m and 49n and one signal at logic level 1 at the output 49o.

It should be noted that the use of the encoding unit 49 in binary code with four outputs 49l-49o, for example, allows sixteen inputs 49a-49i to be encoded and managed and therefore, at the limits, allows a directional button with fifteen operating positions in addition to the non-operating position to be managed. In case of use of an encoding unit 49 for a directional button with five positions as the directional button 4 of the embodiment described above, vice-versa, three outputs suffice.

Alternatively, a different type of encoding can be used, for example a BCD code, a Gray code, etc.

The signals at the outputs 40l-49o of the encoding unit 49 are detected at the inputs of the microprocessor M of the management unit 9 for the directional button 40, and are suitably used by the latter, by the management and control unit 10 for the display unit 7, and by the management and control unit 11 for the functions of the cyclecomputer 1.

Figure 11:
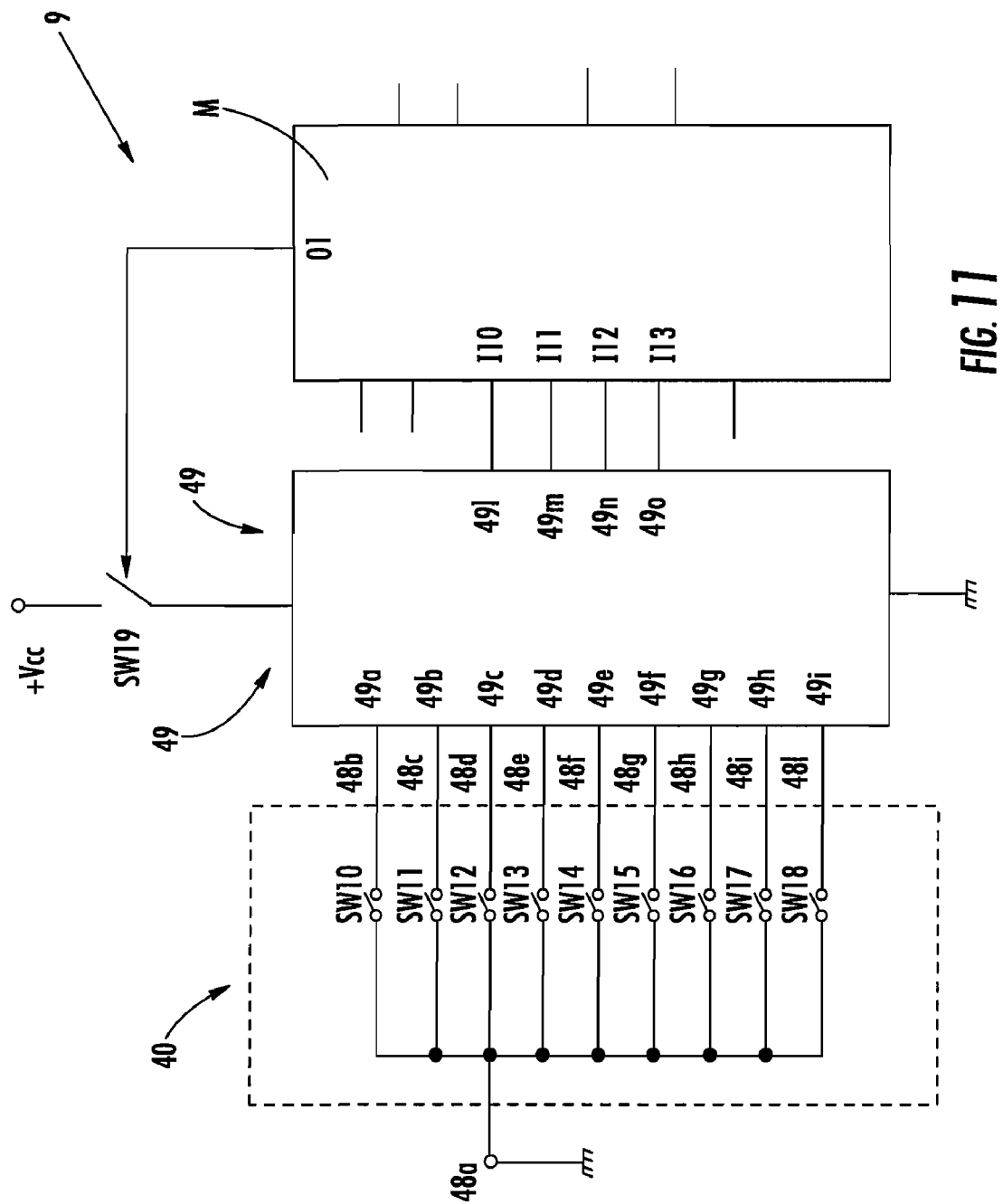
FIG. 11 shows an alternative logic diagram of the cyclecomputer of FIG. 1 with the directional button of FIG. 9.

In the embodiment of FIG. 10, the encoding unit 49 is constantly connected with a power supply terminal +Vcc. In order to reduce the energy consumption of the encoding unit 49, between the encoding unit 49 and the power supply terminal +Vcc a controlled switch SW19 can be arranged that is driven close and open by an output O1 of the microprocessor M, as shown in the embodiment of FIG. 11. A possible form of the control signal at the output O1 could be the one previously described with reference to FIG. 8. The switch SW19 is closed by the management unit 9 only for short time instants Ts, cyclically over a period T, for example for 0.1 ms every 1 ms, so that the power supply of the encoding unit 49 and the detection at the inputs I10-I13 only takes place in such short time instants Ts.

Figure 12:
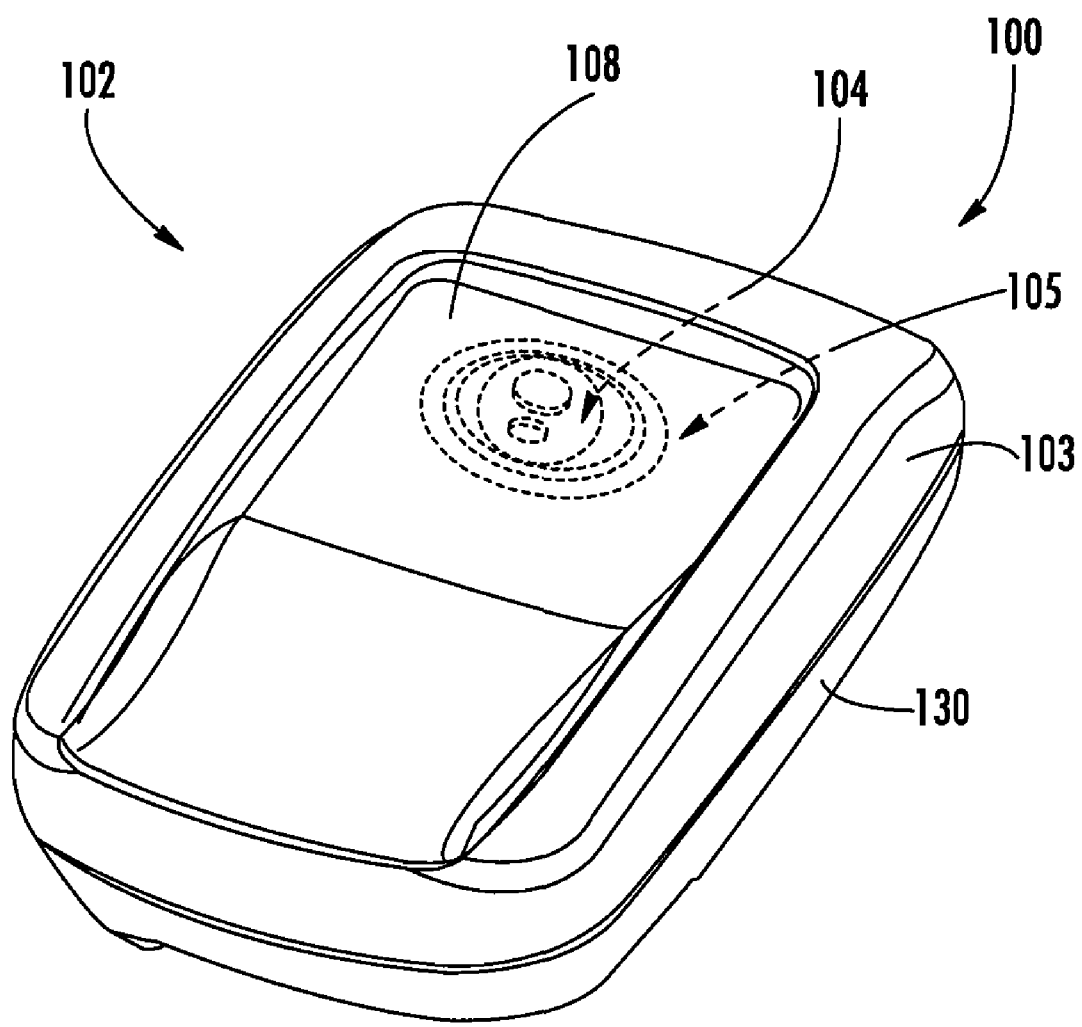
FIG. 12 shows an isometric view of a human-bicycle interaction device or cyclecomputer according to another embodiment of the invention.
Figure 13:
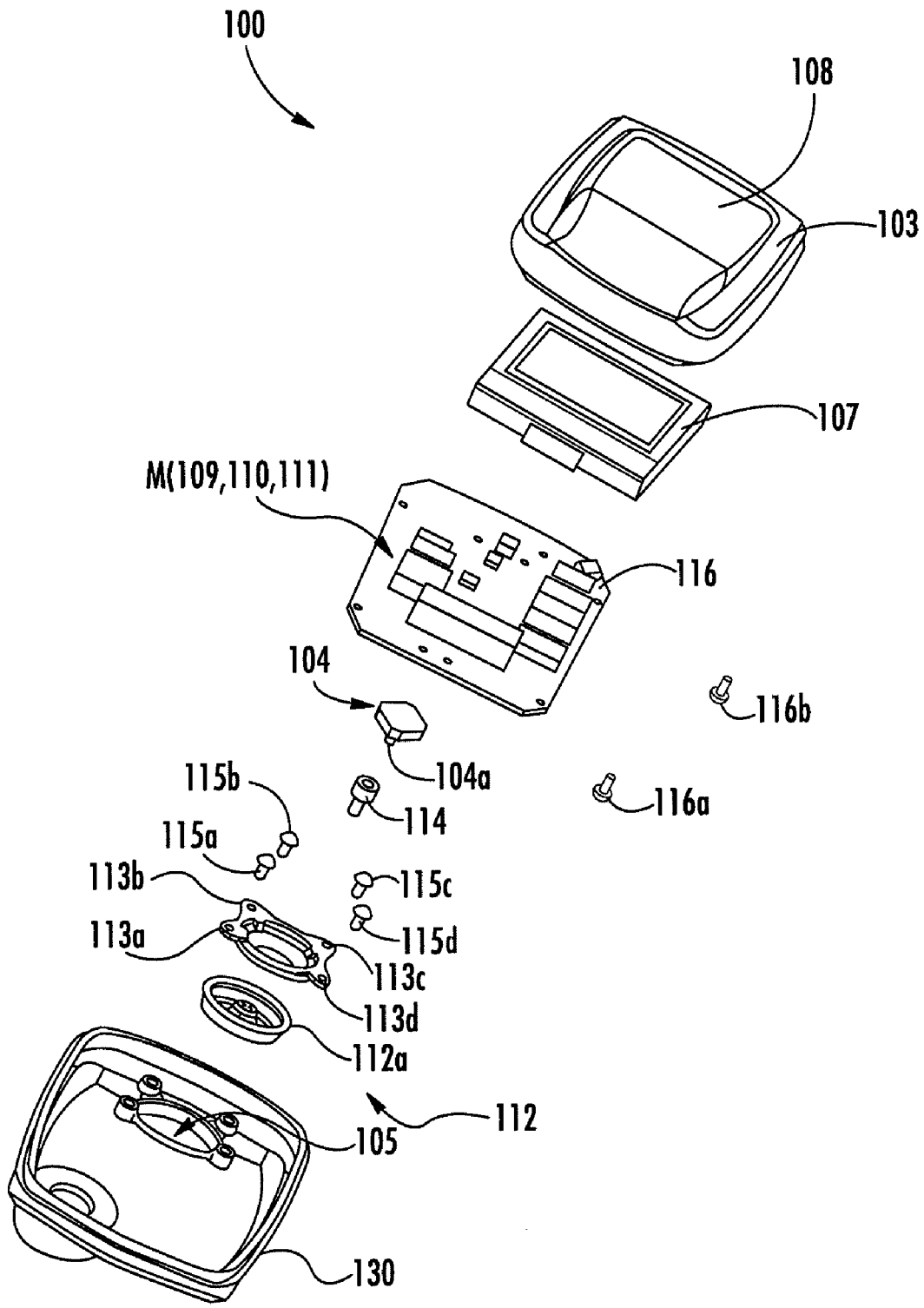
FIG. 13 shows the exploded view of the cyclecomputer of FIG. 12.

In FIGS. 12 and 13 a second embodiment of a human-bicycle interaction device according to the invention in the form of a cyclecomputer 100 is shown. The portions that are the same as or corresponding to the cyclecomputer 1 of the first embodiment are numbered with corresponding reference numerals, increased by 100, and reference is made herein to what has been described above, that is applicable mutatis mutandis. The cyclecomputer 100 differs from the cyclecomputer 1 described above in that the directional button 140 is arranged at the bottom of the cyclecomputer 100. Consequently, the size of the display unit 7 being equal, the size of the cyclecomputer 100 can be further reduced. Moreover, the directional button 140 provided at the bottom is better protected against rain. The connector is omitted from FIG. 13 for the sake of clarity.

Figure 14:
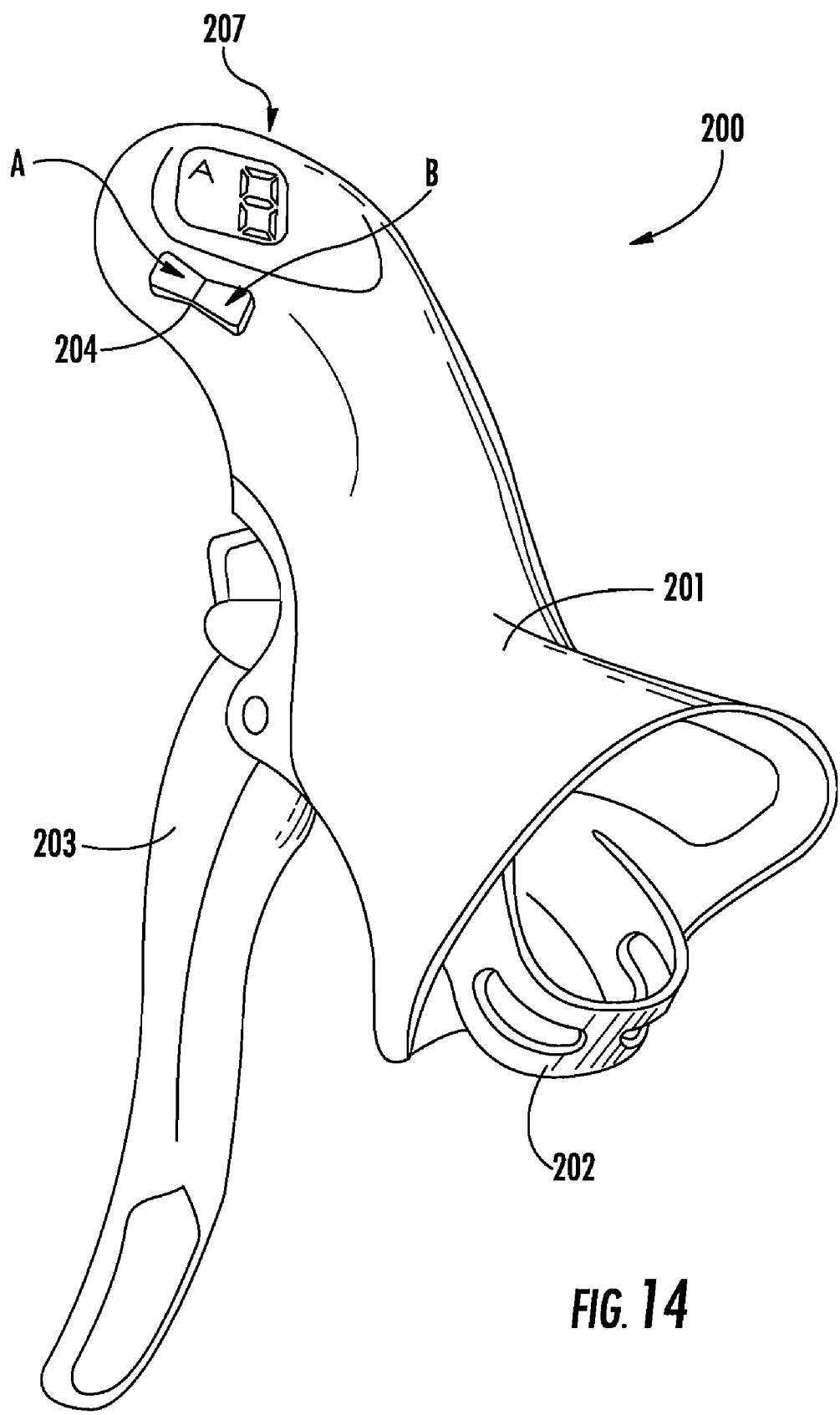
FIG. 14 shows an isometric view of a human-bicycle interaction device or control device according to another embodiment of the invention.

In FIG. 14 an embodiment of a human-bicycle interaction device according to the invention in the form of a control device 200 is shown.

The control device 200 comprises a main body 201 fixable to the handlebars of a bicycle, near to the grip, in a conventional manner, for example through a strap 202, and comprises a display unit 207, a directional button 204 and, preferably, a brake lever 203. The bicycle control device 200 has two sides, one facing another one of the control devices and another facing a generally opposite direction. The display unit 207 is shown as facing in a direction facing another one of the control devices, although the display unit 207 could be mounted on a top side of the control device 200 facing upwards toward a rider or in other positions. The embodiment shown is suitable for assembly on curved handlebars, but the invention applies likewise to straight handlebars.

The directional button 204 has two operating positions, in addition to the non-operating one, indicated with A and B, and it is used by the cyclist for example to impart gearshifting commands in the two directions to an electronic or electromechanical gearshift. In the case of FIG. 14, it being a right control device 200, the directional button 204 is used to control the rear derailleur associated with the sprockets, and the brake lever 203 is used to control the rear brake. On the display unit 207, the sprocket currently engaged by the chain is shown.

The constructive details of the control device 200 are not described for the sake of brevity and because they are within the skills of those skilled in the art in light of the previous description.

In an alternative embodiment, the directional button 204 could have three or more directions. For example, it may be provided to manage a third operating position to allow other parameters to be shown on the display unit 207, for example speed, heart rate, temperature, etc.

Figure 15:
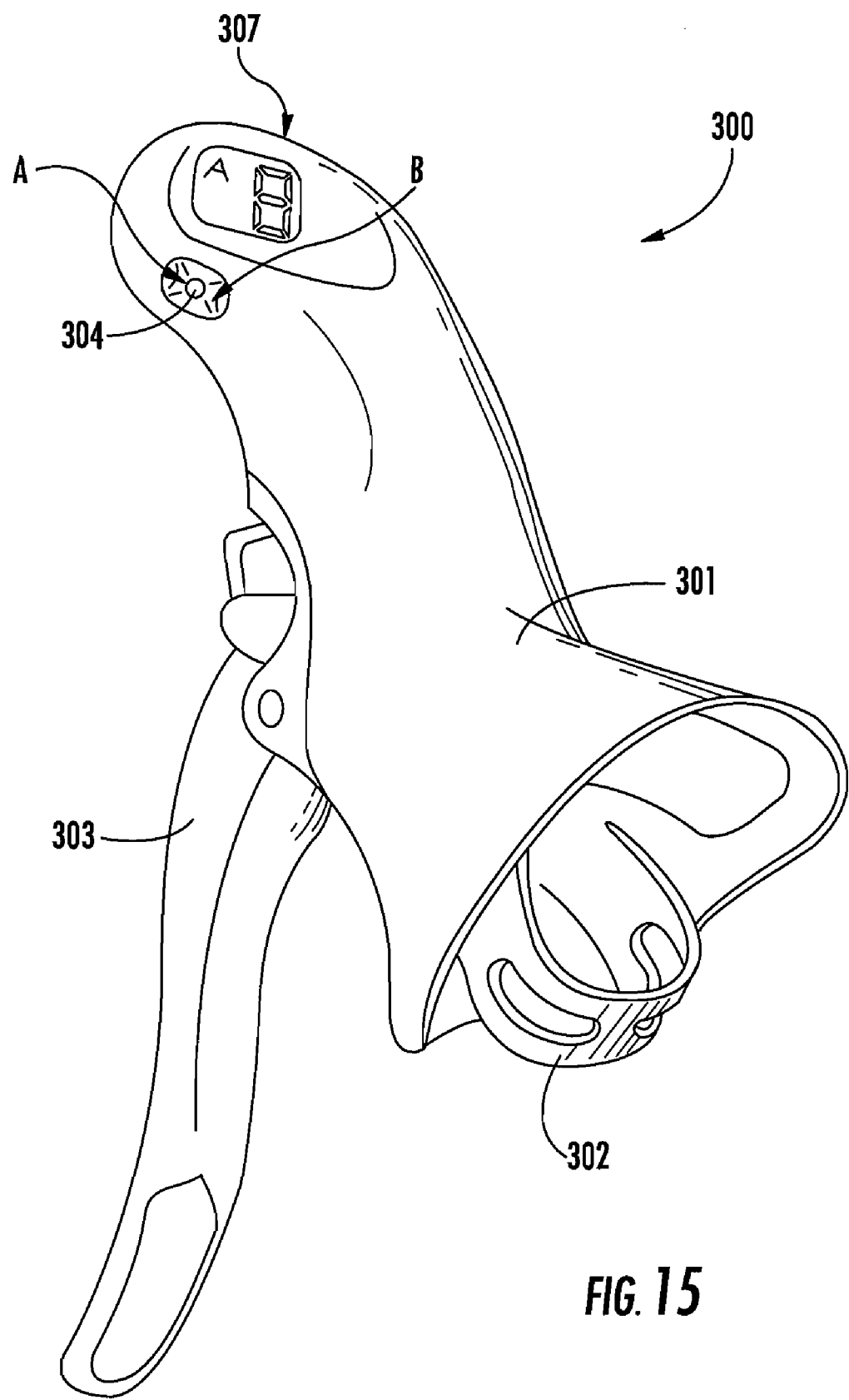
FIG. 15 shows an isometric view of a human-bicycle interaction device or control device according to another embodiment of the invention.

For example, in the embodiment of the human-bicycle interaction device or control device 300 shown in FIG. 15, the directional button 304 corresponds with the directional button 4 or the directional button 40 described above. The portions that are the same as or corresponding to the control device 200 of FIG. 14 are numbered with corresponding reference numerals, increased by 100.

In an alternative embodiment, the control device 200 or 300 could further comprise one or two levers for mechanically or electrically commanding a derailleur, the directional button 204 or 304 being used to impart management commands of the display unit 207 or 307 such as the selection of the data to be displayed at a given time.

In the various embodiments described, the display unit 7, 107, 207, 307 is preferably a liquid crystal display with one or more seven-segment characters, but alternatively alternative technologies can be used, like for example OLED (organic LED). Should the function associated with the different operating positions of the directional button 4, 40, 140, 204, 304 change according to what is currently shown on the display unit 7, 107, 207, 307, such a function can be indicated on the display unit 7, 107, 207, 307 itself, therefore making a sort of graphical user interface (GUI).

Those skilled in the art shall understand that the normally open switches SW1-SW19 could be replaced with normally closed switches, provided that the necessary circuit changes are made.

What is claimed is:

1. Human-bicycle interaction device, comprising:
a display unit;
an interface for entering electronic commands to the display unit, wherein the interface comprises a directional button having a non-operating position, at least two operating positions, and a plurality of switches for changing the display unit; and
a plurality of management units, at least one of the plurality of management units includes an insulation switch that limits a supply voltage to the plurality of switches and the insulation switch is driven by a periodic signal having a short duty cycle;
wherein the display unit is only changed when the insulation switch is activated.

2. Device according to claim 1, wherein the operating positions are in a number selected from among a group consisting of: two, three, five and nine.

3. Device according to claim 1, wherein one of the operating positions is obtained by pressing the directional button.

4. Device according to claim 1, wherein part of the operating positions are obtained by tilting a shaft of the directional button along equally angularly spaced directions.

5. Device according to claim 1, comprising a casing.

6. Device according to claim 5, wherein the casing is made of two tightly joined portions.

7. Device according to claim 6, wherein the two portions of the casing are joined through a method chosen from a group consisting of: ultrasound gluing, gluing with interposition of a glue, and screwing with interposition of a sealing gasket between the two portions.

8. Device according to claim 5, comprising a button cover at an aperture of the casing and at the directional button, the button cover being tightly associated with the casing.

9. Device according to claim 8, wherein the button cover is made of a silicone-like material, and has an abutment edge, a pressing member being provided to push the abutment edge against the casing.

10. Device according to claim 5, comprising an area of yielding material integrally made with the casing at the directional button.

11. Device according to claim 5, comprising a transparent window at the display unit, the transparent window being tightly joined with the casing.

12. Device according to claim 11, wherein the transparent window is integral with the casing.

13. Device according to claim 11, wherein the transparent window is inserted in an aperture of the casing, with a seal provided between the transparent window and the aperture.

14. Device according to claim 1, further comprising a data and/or power connector for removable connection, through a matching connector, with a power source and/or with one or more devices of the bicycle.

15. Device according to claim 14, comprising a tight seal between the connector and a casing of the device.

16. Device according to claim 14, comprising a collar projecting outwards from the casing around the connector.

17. Device according to claim 5, comprising a battery power source housed within the casing.

18. Device according to claim 1, comprising a wireless transceiver unit for communicating with one or more devices of the bicycle.

19. Device according to claim 1, wherein the plurality of management units includes a management unit for the directional button, a management and control unit for the display unit, and a management and control unit for a plurality of selectable functions of the human-bicycle interaction device.

20. Device according to claim 19, wherein the management and control units share a single micro-processor unit.

21. Device according to claim 1, wherein the plurality of switches each has a normal state and an actuation state corresponding to an operating position of the directional button, and comprising a management unit for the directional button that detects the actuation state of one of the plurality of switches.

22. Device according to claim 19, wherein the at least one of the plurality of management units comprising the insulation switch that limits a supply voltage to the plurality of switches, the insulation switch driven by a signal having a short duty cycle is the management unit for the directional button.

23. Device according to claim 21, wherein the management unit for the directional button comprises a unit for encoding the state of the plurality of switches.

24. Device according to claim 22, wherein the management unit for the directional button comprises a unit for encoding the state of the plurality of switches.

25. Device according to claim 1, in the form of a cyclecomputer.

26. Device according to claim 25, wherein the interface only comprises one directional button.

27. Device according to claim 25, wherein the directional button is accessible from an upper surface of a casing of the cyclecomputer.

28. Device according to claim 25, wherein the directional button is accessible from a lower surface of a casing of the cyclecomputer.

29. Device according to claim 1, in the form of a control device.

30. Device according to claim 29, further comprising at least one lever.

31. Device according to claim 30, wherein the at least one lever imparts mechanical commands.

32. Device according to claim 30, wherein the at least one lever actuates at least one switch.

33. Human-bicycle interaction device, comprising:
a display unit;
an interface for entering electronic commands to the display unit, wherein the interface comprises a directional button having a non-operating position, at least two operating positions, and a plurality of switches for changing the display unit; and
a plurality of management units, at least one of the plurality of management units includes an insulation switch that limits a supply voltage to the plurality of switches and the insulation switch is driven by a periodic signal having a short duty cycle;
wherein the display unit is only changed when the insulation switch is activated; and
the operating positions are obtained by tilting a shaft of the directional button along equally angularly spaced directions.

34. Human bicycle interaction device, comprising:
a display unit;
an interface for entering electronic commands to the display unit, wherein the interface comprises a directional button having a non-operating position, at least two operating positions, and a plurality of switches for changing the display unit; and
a plurality of management units, at least one of the plurality of management units includes an insulation switch that limits a supply voltage to the plurality of switches and the insulation switch is driven by a periodic signal having a short duty cycle; and
a casing made of two portions tightly joined through a method chosen from a group consisting of: ultrasound gluing and gluing with interposition of a glue;
wherein the display unit is only changed when the insulation switch is activated.

35. Human-bicycle interaction device, comprising:
a display unit;
an interface for entering electronic commands to the display unit, wherein the interface comprises a directional button having a non-operating position, at least two operating positions, and a plurality of switches for changing the display unit; and
a plurality of management units, at least one of the plurality of management units includes an insulation switch that limits a supply voltage to the plurality of switches and the insulation switch is driven by a periodic signal having a short duty cycle;
a data and/or power connector for removable connection, through a matching connector, with a power source and/or with one or more devices of the bicycle; and
a tight seal between the connector and a casing of the device;
wherein the display unit is only changed when the insulation switch is activated.

36. Human-bicycle interaction device, comprising:
a display unit;
an interface for entering electronic commands to the display unit, wherein the interface comprises a directional button having a non-operating position, at least two operating positions, and a plurality of switches for changing the display unit; and
a plurality of management units, at least one of the plurality of management units includes an insulation switch that limits a supply voltage to the plurality of switches and the insulation switch is driven by a periodic signal having a short duty cycle;
a data and/or power connector for removable connection, through a matching connector, with a power source and/or with one or more devices of the bicycle; and
a collar projecting outwards from a casing around the connector;
wherein the display unit is only changed when the insulation switch is activated.

37. Device according to claim 1,
wherein the directional button extends outwards of the casing.

* * * * *

UNITED STATES PATENT AND TRADEMARK OFFICE
CERTIFICATE OF CORRECTION

PATENT NO. : 8,149,098 B2
APPLICATION NO. : 12/021609
DATED : April 3, 2012
INVENTOR(S) : Federico Miglioranza It is certified that error appears in the above-identified patent and that said Letters Patent is hereby corrected as shown below:

ON THE TITLE PAGE

1. On Page 2, item (56), under "FOREIGN PATENT DOCUMENTS", in Column 2, Line 6, delete "WO 2005041234 5/2005". (*Repeated Entry*)

2. On Page 2, item (56), under "OTHER PUBLICATIONS", in Column 2, Lines 3-4, delete "European Search Report, Appl. No. EP 08005414.1-2421, dated Apr. 6, 2009". (*Repeated Entry*)

3. On Page 2, item (56), under "OTHER PUBLICATIONS", in Column 2, Line 5, delete "Acton," and insert -- Action, --, therefor.

4. On Page 2, item (56), under "OTHER PUBLICATIONS", in Column 2, Lines 7-8, delete "European Search Report, Appl. No. EP 08005436, dated Jan. 30, 2009". (*Repeated Entry*)

5. On Page 2, item (56), under "OTHER PUBLICATIONS", in Column 2, Lines 9-10, delete "European Search Report, Appl. No. EP 08005414.1-2421, Apr. 6, 2009". (*Repeated Entry*)

6. In Column 7, Line 15, delete "450" and insert -- 45° --, therefor.

7. In Column 7, Line 26, delete "48$b$-48$i$" and insert -- 48$b$-48$l$ --, therefor.

8. In Column 7, Line 66, delete "40$l$-49$o$" and insert -- 49$l$-49$o$ --, therefor.

IN THE CLAIMS

9. In Column 11, Line 18, in Claim 34, delete "Human bicycle" and insert -- Human-bicycle --, therefor.

Signed and Sealed this
Twentieth Day of November, 2012

David J. Kappos
*Director of the United States Patent and Trademark Office*